July 15, 1941.　　　A. A. PRUCKNER　　　2,249,169
CHUCK
Original Filed Aug. 15, 1938　　　4 Sheets-Sheet 2
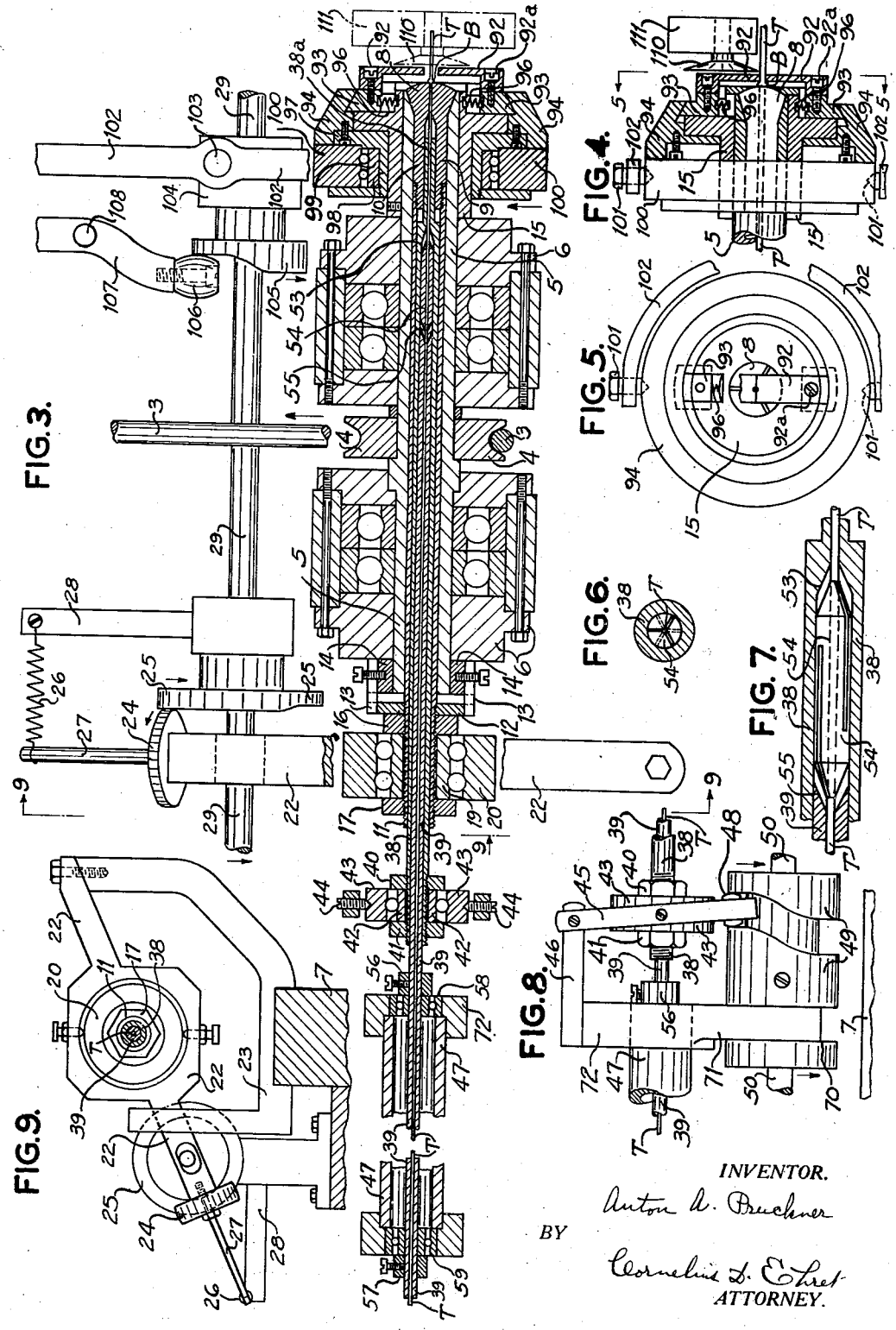
INVENTOR.
Anton A. Pruckner
BY
Cornelius L. Ehret
ATTORNEY.

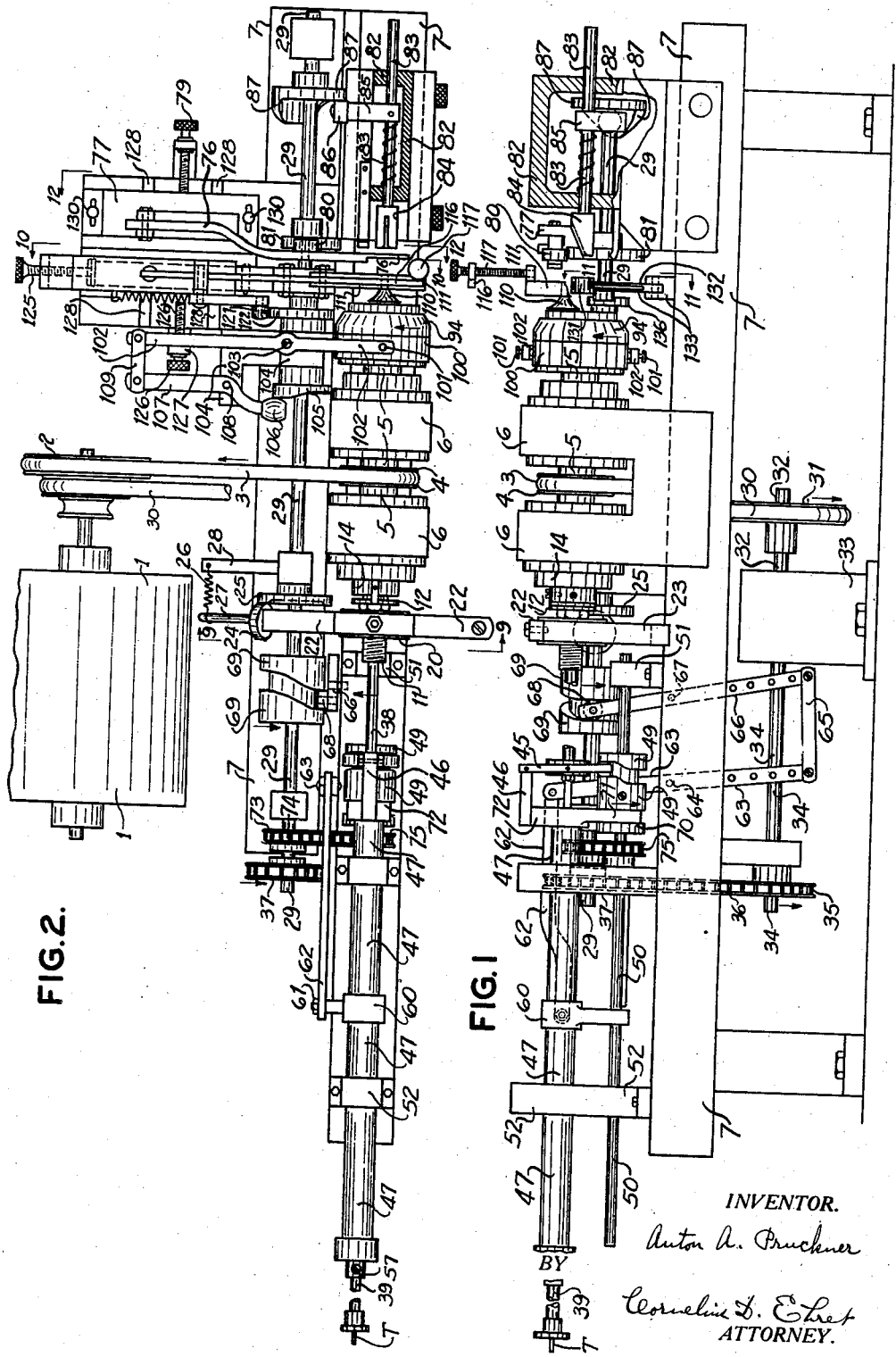

July 15, 1941.  A. A. PRUCKNER  2,249,169
CHUCK
Original Filed Aug. 15, 1938   4 Sheets-Sheet 3

INVENTOR.
Anton A. Pruckner
BY
Cornelius D. Ehret
ATTORNEY.

July 15, 1941.   A. A. PRUCKNER   2,249,169
CHUCK
Original Filed Aug. 15, 1938   4 Sheets—Sheet 4
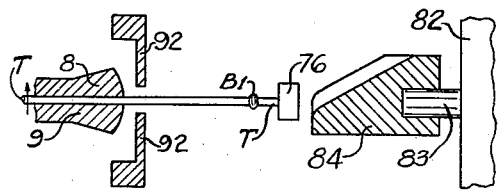
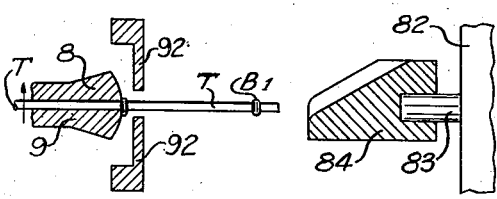
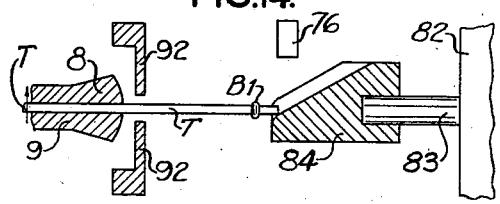
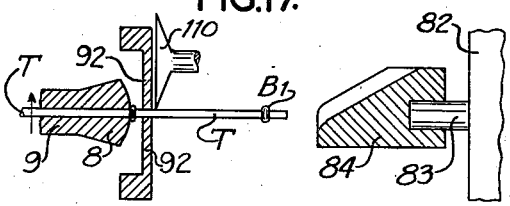
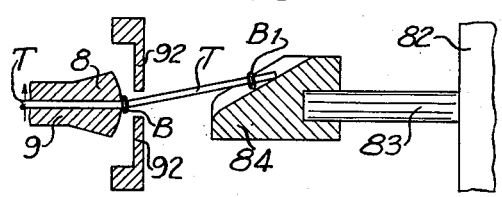
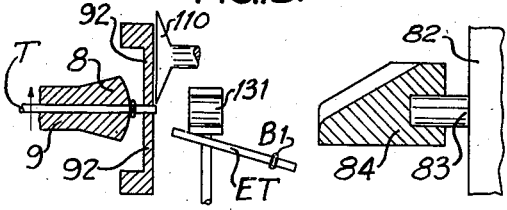
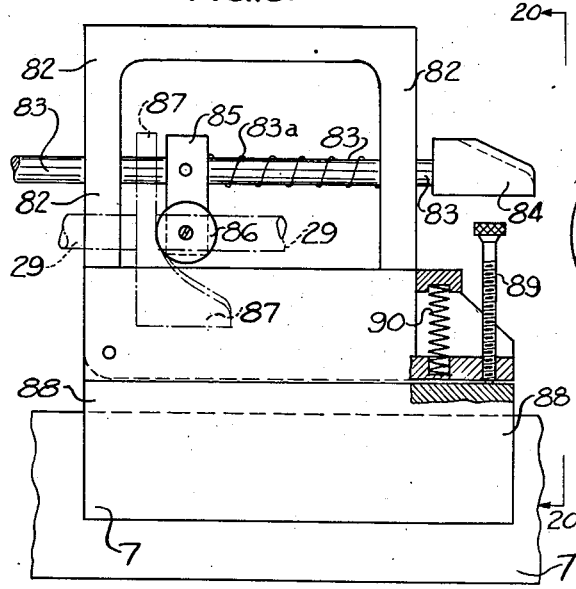
INVENTOR.
Anton A. Pruckner
BY
Cornelius D. Ehret
ATTORNEY.

Patented July 15, 1941

2,249,169

UNITED STATES PATENT OFFICE 2,249,169

CHUCK

Anton A. Pruckner, Bridgeport, Conn., assignor to Superior Tube Company, Philadelphia, Pa., a corporation of Pennsylvania Original application August 15, 1938, Serial No. 224,928. Divided and this application May 22, 1940, Serial No. 336,532

9 Claims. (Cl. 279—1)

My invention relates to chucks, and particularly to automatic chucks and their operating mechanisms.

In accordance with my invention, a chuck is provided with structure movable during rotation of the chuck to position to support the work beyond or at a distance from the component of the chuck which holds and drives it; more particularly, the aforesaid structure comprises jaws, between which the work is supported, controlled by a cam member, rotating with the chuck and movable axially thereof, as by mechanism operating in timed relation to rotation of the chuck.

My invention further resides in features of construction, combination and arrangement hereinafter described and claimed.

This application is a division of my co-pending application Serial No. 224,928, filed August 15, 1938. Features herein disclosed but not claimed are claimed in my aforesaid application and in divisional application Serial No. 296,576, filed September 26, 1939.

For an understanding of my invention, reference is to be had to the accompanying drawings in which:

Fig. 1 is a side elevational view, with some parts broken away and some in section, of a machine for making beaded tubular elements;

Fig. 2, with some parts in section, is a plan view of the machine shown in Fig. 1;

Fig. 3 is a detail view, in plan and on enlarged scale, of tube-feeding and tube-holding mechanism shown in Figs. 1 and 2;

Fig. 4 is a side elevational view of chuck mechanism shown in Fig. 3 with some parts broken away;

Fig. 5 is a front elevational view, partly in section, of the chuck mechanism shown in Fig. 4;

Fig. 6 is a detail view in front elevation of a collet-chuck shown in Fig. 3;

Fig. 7 is a detail view, partly in section and on enlarged scale, of parts of the feeding mechanism shown in Fig. 3;

Fig. 8 is a side elevational view on enlarged scale of control mechanism for the parts shown in Fig. 7;

Fig. 9 is a front elevational view, on enlarged scale, taken on line 9—9 of Fig. 2;

Figs. 13 to 18 illustrate the successive steps of a method for making beaded tubular elements;

Fig. 19 is a side elevational view, on enlarged scale, of beading mechanism shown in Figs. 1 and 2;

Fig. 20 is a front elevational view of the mechanism shown in Fig. 19.

Figure 10:
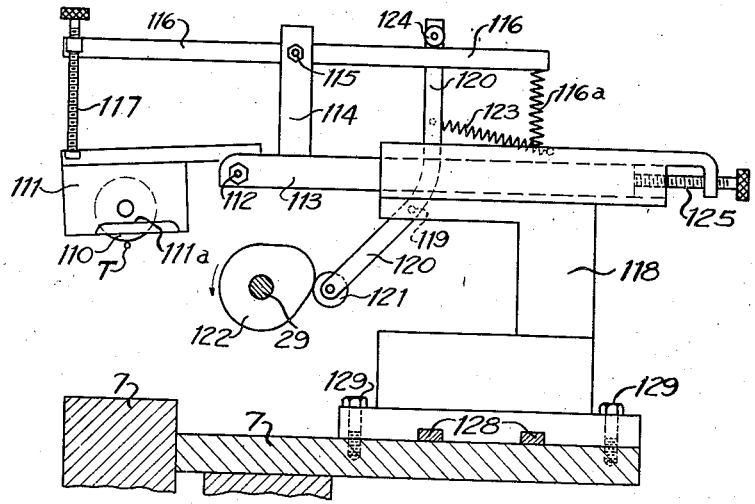
Fig. 10 is a front elevational view, on enlarged scale, taken on line 10—10 of Fig. 2.

Referring to Figs. 1, 2 and 3 of the drawings, the motor 1 is connected by pulley 2, belt 3 and pulley 4 to the hollow spindle 5 supported by the bearing members 6 extending above the frame or bed 7. At the forward end of spindle 5 the bore thereof tapers outwardly to fit the corresponding taper of the head 8 of the collet-chuck 9 whose shank 10 closely fits the main bore of the spindle. The inner end of the shank 10, of reduced diameter, is threaded to receive one end of the sleeve 11 which extends through the spindle and projects to substantial extent beyond the rear end thereof.

To the rear extension of the sleeve 11 is secured the coupling member 12 from which extend the bars or slides 13 received by slots in the member 14 secured to spindle 5 and abutting the rear bearing 6 to serve as a thrust member precluding axial movement of the spindle 5 to the right. Axial movement of the spindle 5 to the left is prevented by engagement between the forward face of the front bearing 6 and the rear face of the member 15 secured to the forward extension of spindle 5.

The nuts 16, 17, threaded upon the rear extension of the sleeve 11, hold between them the inner race 19 of a ball bearing whose outer race 20 is pivotally held (Fig. 9) to the arm 22 pivotally mounted upon the upper end of a bracket 23, Fig. 1, extending upwardly from the frame 7 of the machine. Near the other end of the arm 22 is mounted the cam follower 24 held against the cam 25 by spring 26 connected between extension 27 of arm 22 and the stationary bracket 28. The cam 25 is secured to shaft 29 driven from motor 1 at speed substantially lower than the speed of spindle 5 through the belt 30, pulley 31 on shaft 32 of a reduction gear box 33 (Fig. 1), the shaft 34, sprocket 35, chain 36 and sprocket 37 on shaft 29.

The speed of shaft 29, which makes one revolution for each cycle of the machine, may be from 50 to 80 revolutions per minute or higher; the speed of the spindle 5 is substantially higher, and preferably of the order of 1800 revolutions per minute. The most suitable spindle speed will depend upon the diameter and material of tubing T. When, during each revolution of cam 25, the cam follower 24 moves to the right (Figs. 1 and 3)

the rotating sleeve 11 is moved to the right, permitting the split head 8 of the collet-chuck 9 to expand and so release its grip upon the piece of metallic tubing T which extends entirely through the spindle 5 and through other elements of the machine, as hereinafter described. When cam 25 forces the arm 22 to the left, the sleeve 11 is likewise moved to the left to draw in the collet-chuck, the taper at the forward end of the bore of spindle 5 compressing the slit head 8 again firmly to hold the tubing T.

During the interval in each cycle of the machine when the collet-chuck is released from the tubing T, the tubing is fed to the right to a predetermined extent through the spindle by the mechanism now described. Within the sleeve 11 are two more concentric sleeves 38, 39 (Fig. 3). The outer of these two sleeves is provided with a guide extension 38a of reduced diameter which is slidably received by the bore of the shank 10 of the collet-chuck 9.

Upon the other end of the sleeve 38 are threaded the nuts 40, 41 which hold between them the inner race 42 of a ball bearing whose outer race 43 is pivotally mounted by pins 44, 44 to arm 45 whose upper end (Figs. 1 and 8) is pivotally mounted upon the member 46 attached to member 72 on the forward end of the linearly reciprocable tubular member 47. The lower end of arm 45 is provided with a cam follower 48 received by the groove of cam 49 attached to shaft 50 supported for rotation and axial reciprocation by the bearing members 51 and 52 extending upwardly from the frame 7 of the machine (Fig. 1).

When cam 49 swings the member 45 in clockwise direction (Fig. 8) the sleeve 38 is moved to the left so that the taper 53 at the forward end of its bore (Figs. 3 and 7) engages the tapered forward end of a split sleeve 54 and moves it to the left so that the rear tapered end of the split sleeve member 54 engages the taper 55 at the forward end of the innermost sleeve 39. This relative movement of the sleeves 38, 39 compresses the split sleeve 54 firmly to hold the tubing T which extends therethrough. While the sleeves 38, 39 are in this position, both sleeves are moved to the right to feed the tubing T through the collet-chuck which, at this time, is open or released from the tubing. To effect this feeding movement, there are secured to the rear extension of the innermost sleeve 39 the stops 56 and 57 (Figs. 1, 2 and 3); the forward stop 56, as more clearly shown in Fig. 3, abuts the forward end of a ball bearing 58 at the forward end of the tubular member 47, and the rear stop 57 engages the rear face of a ball bearing 59 disposed within the other end of the tubular member 47. There is connected to the member 47, intermediate its ends, the support 60 for the pin 61 (Fig. 2) connected by link 62 to the upper end of the lever 63 pivotally mounted at 64 (Fig. 1) upon the frame 7 and whose lower arm is connected by link 65 to the lower arm of a similar lever 66 pivoted at 67 upon the frame 7 and whose upper arm carries a cam follower 68 received by the groove in cam 69 on the shaft 29.

During each revolution of shaft 29, the cam 69 effects a forward and a return stroke of the tubular member 47 to reciprocate the inner sleeve 39. The cam 49 is so timed with respect to cam 69 that just before beginning of the forward movement of sleeve 39, the sleeve 38 is moved to the left with respect thereto to close the split sleeve 54 upon the tubing T so that, during forward movement of member 47 and sleeves 38 and 39 under the control of cam 69, the tubing T is moved therewith bodily to the right through chuck 9 which at this time is open. After the collet-chuck 9 has closed upon the tubing T under the control of its cam 25, the cam 49 effects movement of sleeve 39 to the left with respect to sleeve 38 to release the split sleeve 54 so that, during the return stroke of sleeves 38 and 39 to the left, the split sleeve 54 simply slides along the tubing.

In order to prevent the axial reciprocation of the member 47 from disturbing the desired relations between the cam 49 and member 45, the cam 49 is provided with a groove 70 which receives the yoke extension 71 of the member 72 at the forward end of the slidable sleeve 47. Consequently, as tubular member 47 moves to the right and left, the cam 49 partakes of similar movement and maintains the same relative position with respect to member 47. The shaft 50 of cam 49 is driven from the shaft 29 by the sprocket 73, chain 74 and sprocket 75 slidably keyed to the axially reciprocable shaft 50. The extent of feed of the tubing T may conveniently be varied by shifting the points of connection of link 65 to the levers 63 and 66 interposed between the cam 69 and the slidable member 47; to that end, the lower arms of the levers 63, 66 may each be provided with a series of pivot-pin holes.

Figure 12:
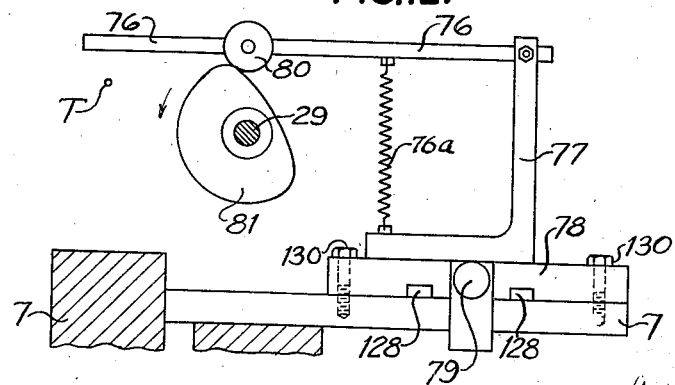
Fig. 12 is a front elevational view, on enlarged scale, taken on line 12—12 of Fig. 2.

Preferably, the stroke of member 47 is selected to be slightly greater than the desired length of the tubular electrodes or like tubular elements to be cut in succession from the forward end of the tubing T projecting beyond the collet-chuck; an exactly correct length of tubing beyond the chuck is determined by a stop 76 controlled as hereinafter described. The frictional grip of the split sleeve 54 upon the tubing T is sufficient to effect its forward feed, and yet is not so great as to in any way damage the tubing when its forward end is arrested by the stop and the sleeve 54 is forced to continue its feeding movement for a slightly longer time by continued forward movement of the inner sleeve 38. This continued grip and feed forward holds and forces tubing against the stop—thus insuring exact length of the projecting section of the tubing. The stop 76, as more clearly appears in Figs. 1, 2 and 12, comprises an arm whose forward end is adapted to swing into the axis of rotation of member 5 to intercept the tubing being fed axially thereof, as hereinbefore described. The rear end of the arm 76 is pivotally mounted upon a bracket 77 secured to a slide 78 adjustable as by the threaded member 79, in direction parallel to the axis of rotation of member 5. Upon the arm 76 is mounted the cam follower 80 for engaging the periphery of the cam 81 on the one-time shaft 29. Preferably, the arm 76 is biased to maintain engagement of cam follower 80 with cam 81 by the spring 76a. The cam 81 is so shaped that suitably before the end of the forward stroke of the tubular feed member 47, the arm 76 is dropped (Fig. 13) to intercept the leading end of the tubing T being fed through the collet-chuck. Thereafter, the cam 81 lifts the arm 76 and holds it above the tubing (Figs. 6, 12 and 14) during other operations, hereinafter described, performed upon the projecting piece of tubing.

Beyond the forward end of the spindle 5 there is adjustably mounted, upon the bed 7 of the machine, the supporting member 82 for the bar 83 which carries the grooved tool 84 (Figs. 1, 2, 19 and 20). To the bar 83 is secured the arm 85 which carries the cam follower 86 engaged by cam 87 on the one-time shaft 29. After the stop 76 is lifted, the cam 87 permits movement of bar 83 to the left (Figs. 2 and 14) so that the forward end of the rotating tubing held by the chuck 9 is received by the groove in tool 84, and as the movement of tool 84 continues to the left under the control of spring 83a and cam 87, the projecting portion of the tubing is bent upwardly, Fig. 15, due to the upward slope of the bottom of the groove in tool 84. The sides of the groove prevent rotation of the projecting section of the tube about the axis of rotation of the chuck and, in fact, prevent all rotation of the bent section except about its own axis. In consequence, there is formed, as shown in Fig. 15, a peripheral bead B at the bend in the tubing. (Bead B1 was similarly formed in the prior cycle of the machine.)

To afford fine adjustment of the height of the bead, the angle between the axis of rotation of the tubing and the line of reciprocation of the member 84 may be varied; for example, as shown more clearly in Fig. 19, the supporting frame 82 for bar 83 may be pivotally mounted upon the base member 88 and the angle controlled by the threaded stop 89 whose lower end abuts the upper face of member 88. A spring 90 between member 82 and 88 may be used to prevent vibration of the machine from disturbing the desired angular relation.

The two sections of tubing T, one section being the straight section held by the chuck 9 and the other section being the bent section projecting beyond the chuck, continuously rotate, each about its own axis, and centrifugal force causes the forward end of the bent section to follow the bottom of the groove as the member 84 retracts so that the two sections of tubing again come into alignment when tool 84 is fully retracted (Fig. 16). This self-straightening of the tubing is not effected if rotation of the tubing is stopped during the retraction of member 84.

After the tubing has been straightened, the pair of members 92 having complementary semi-circular notches move into engagement with the tubing beyond bead B to embrace and support it during a cutting-off operation hereinafter described. The jaw members 92, 92, as more clearly appears in Figs. 3, 4 and 5, are mounted upon slides 93, 93 received by radial grooves in the front face of member 15 attached to the forward end of spindle 5. The outer ends of the slides 93 are tapered to match the inner taper of ring 94 which encircles member 15. Springs 96 bias the pair of slides and supporting members 92 away from each other. The ring 94 is attached to member 97 whose hub 98 supports the inner race 99 of a ball-bearing whose outer race 100 receives pivot pins 101 at the forked end of lever 102 pivoted at 103 to the standard 104 extending upwardly from frame 7 of the machine. Clockwise movement of lever 102 (Figs. 1 and 3) effects movement of ring 94 to the left so that the aforesaid inner taper thereof forces slides 93, 93 and jaws 92 toward and into engagement with the tubing T suitably beyond bead B. Upon reverse movement of lever 102, the springs 96 restore the slides and jaws to their original open position.

The movement of lever 102 is controlled by cam 105 on the one-time shaft 29; the face of the cam engages the cam follower 106 on arm 107 pivoted at 108 to standard 104 and connected by link 109 to lever 102.

Jaws 92 are replaceable by similar jaws differently notched to accommodate different sizes of tubing and having bases 92a of different length to support the tubing at different desired distances beyond the collet-head 8.

The cam 105 is so shaped that the jaws 92 close upon the tubing after it has been beaded and straightened and before engagement therewith of the scoring disk 110 (Figs. 1, 2, 10 and 17) rotatably mounted upon member 111 pivotally mounted at 112 upon the adjustable slide 113. The post 114 extending upwardly from slide 113 provides a pivotal support 115 for lever 116 which at its forward end threadably receives the adjusting screw 117 having at its lower end a flared or head member for supporting member 111.

Upon the supporting member 118 for slide 113 is pivotally mounted at 119 the lever 120 having at its lower end a cam follower 121 maintained in engagement with cam 122 on shaft 29 by spring 123. From the upper end of lever 120 extends a pin for supporting the roller 124 which continuously engages the upper face of lever 116. When cam 122 permits spring 123 to swing arm 120 in clockwise direction, arm 116 is actuated in clockwise direction to lift the scoring disk or cutter 110. When cam 122 swings arm 120 in reverse direction, the biasing spring 116a moves arm 116 in clockwise direction so as to effect engagement of rotatable scoring disk 110 with the rotating tubing T (Fig. 17). The groove 111a in member 111 is to provide a clearance for the bead B1. The rotation of tubing T while disk 110 rests upon it and is rotated thereby produces a circumferential score or groove which weakens the wall of the tubing. The scoring action can be nicely regulated by adjustment of screw 117 which controls the angular relation between member 111 and arm 116 and by adjustment of screw 125 which varies the position of slide 113 to change the distance between pivot 112 of member 111 and the axis of rotation of the tubing.

Though rotatable disk 110 is preferred, it may be replaced by a stright-edged knife non-rotatably attached to member 110.

The distance from the chuck 9 at which the cutter disk 110 engages tubing T may be varied by adjusting the screw 126 which threadably engages the support 118 and passes through the stationary bracket 127. By turning screw 126, the support 118 is moved along the tracks 128 parallel to the axis of rotation of tubing T. Support 118 may be clamped in the desired position by tightening bolts 129 which pass through slots in the base of support 118 into the frame member 7. Similarly, the slidable support 77 for the stop arm 76 may be held in desired position by bolts 130 which pass through slots in the base of support 77 into frame member 7.

After the tubing has been scored, and preferably after knife 110 has been lifted therefrom, it is struck beyond the scoring by tool 131 (Fig. 18) to break or sever the tubing at the scoring and so detach therefrom the beaded element ET suited for use as the cathode, or other component of an electronic tube, such as a spacing sleeve, or for any other purpose requiring a tubular beaded element. The described method of detaching the beaded elements from the remaining length of tubing provides for clean-cut, burr-free ends thereof.

Figure 11:
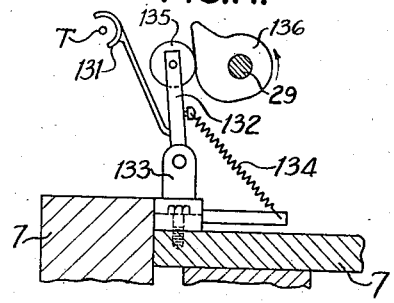
Fig. 11 is a front elevational view, on enlarged scale, taken on line 11—11 of Fig. 1.

As more clearly appears in Fig. 11, the striking tool 131 extends from arm 132 pivotally mounted upon bracket 133 secured to the frame of the machine. The spring 134 biases the arms to maintain engagement between cam follower 135 at the upper end thereof and cam 136 on the one-time shaft 29.

After an element ET has been detached from the tubing, the striker 131 is returned to its original position, supporting jaws 92 move away from each other to clear bead B, stop 76 is dropped to the position shown in Fig. 13, the tubing T is released by opening of chuck 9 and the feeding of the tube T is initiated to bring the next section of tubing in position beyond the chuck (Fig. 13) for formation of another element ET by the steps previously described and diagrammatically shown in Figs. 13 to 18.

With the preferred machine disclosed, all of the operations are performed automatically and the cycles follow without pause or interruption to form tubular elements until a length of tubing is exhausted. The operator then threads the leading end of another elongated piece of tubing through the machine and restarts it.

At considerable sacrifice in the rate of production, any or all of the movements effected by the cams on the one-time shaft 29 can be effected manually and any or all of the steps of the method shown in Figs. 13 to 18 may be effected either manually or by mechanism differing substantially from the mechanism shown in Figs. 1 and 2.

With the full-automatic machine of Figs. 1 and 2, beaded cathodes having a diameter of from about 0.010" to about 0.100", a wall thickness of from about 0.001" to about 0.004", and a length of from about ¼" to about 1½", are produced at the rate of from about 30 to 60 per minute. With a similar machine of suitably increased dimensions, there may be made, for example, beaded anodes having a diameter of upwards to 0.75", or larger, and a wall thickness of up to about 0.012".

The method of beading described is particularly suited for thin-walled tubing of comparatively small diameter and of metal; for example, it is suited for nickel, aluminum, copper, brass, or any other light-wall metal tubing. The tubing is preferably seamless or drawn tubing although seamed tubing may be used particularly if the seam does not unduly stiffen or thicken it.

In the appended claims, the term "bead," or a variant thereof, is generic to and comprehends circumferential projections or protuberances which in cross-section are rounded, approximately semi-circular, flat-sided, or other configuration.

What I claim is:

1. A chuck having jaws for holding and rotating the work, and auxiliary means carried by the chuck movable, during rotation of the chuck, in one direction to position to support the work during an operation thereon, against deflection, at a region distant from said holding and driving jaws and in reverse direction to another position clear of the work for another operation thereon while held and rotated by said jaws.

2. A rotatable chuck for releasably holding the work for co-axial rotation therewith, auxiliary jaws carried by said chuck, and means movable axially of said chuck, during rotation thereof, in one direction, to effect movement of said jaws to support the work during an operation thereon, against displacement, at a region beyond its engagement with said chuck and in reverse direction to retract said jaws for another operation upon the work while held by and rotating with the chuck.

3. A chuck comprising a means for rotatively driving the work, and auxiliary structure, free of driving engagement with the work, carried by the chuck movable, during rotation of the chuck, in one direction to position to support the work during one operation against deflection, without driving the work, at a region distant from said driving means and in reverse direction to position clear of the work for another operation thereon while rotatably driven by said means.

4. A rotatable chuck for releasably holding and driving work for co-axial rotation therewith, auxiliary jaws, means for supporting said jaws for rotation with said chuck and in such position the work extends beyond said supporting means for a tool operation thereon, and means movable axially of said chuck, during rotation thereof, in one direction to effect movement of said jaws to position to support the work, against deflection thereof during an operation thereon, at a region substantially removed from that at which the work is held and driven by the chuck and in reverse direction to retract said jaws for another operation upon the work while held by and rotating with the chuck.

5. A chuck comprising a rotatable member including a work-holding collet for holding and driving the work, auxiliary jaws, means for supporting said auxiliary jaws for rotation with said member and in such position the work extends beyond said supporting means for a tool operation thereon and for supporting said jaws for movement toward and from supporting engagement with the work at a distance beyond said collet from and toward a position clear of the work held and driven by the collet, and cam structure rotatable with said member and movable axially thereof to effect aforesaid movement of said jaws with respect to said work.

6. A chuck comprising a rotatable member having a bore axially thereof, a sleeve slidable within said bore, a work-holding collet within said sleeve compressed upon and released from the work by sliding movement of said sleeve in said bore, auxiliary jaws, means supporting said auxiliary jaws for rotation with said member and in such position the work extends beyond said supporting means for a tool operation thereon and also supporting said jaws for movement toward supporting engagement at a distance beyond the collet with work held by said collet and for their reverse movement from the collet to clear the work, and cam structure rotatable with said member and movable axially thereof to effect aforesaid movement of said jaws with respect to the work.

7. A rotatable chuck for releasably holding the work for axial rotation therewith, jaws carried by said chuck, cam means movable axially of said chuck during rotation thereof to effect movement of said jaws to support the work, against displacement, at a region beyond its engagement with said chuck, and means operating in timed relation to rotation of said member intermittently to effect aforesaid axial movement of said cam means.

8. A chuck comprising a rotatable member, a work holding collet rotatable with said member, an element rotatable with said member and movable axially thereof to actuate said collet, jaws rotatable with said member and movable toward and from supporting engagement with work held by said collet, cam structure rotatable with said member and movable axially thereof to effect aforesaid movement of said jaws with respect to the work, and means operating in timed relation to said rotatable member for effecting, in predetermined sequence, axial movements of said element and said cam structure.

9. A chuck comprising a rotatable member having a bore axially thereof and radial grooves in an end face, a sleeve slidable within the bore, a work-holding collet within the sleeve compressed upon and released from the work by sliding movements of the sleeve in opposite directions in said bore, jaws slidable in said grooves movable in one direction to support the work beyond said collet during one operation on the work and in reverse direction to clear the work for another operation thereon while held by the collet, and cam structure rotatable with said member and movable axially thereof to effect aforesaid sliding movements of said jaws.

ANTON A. PRUCKNER.